(No Model.)
T. GRAETHER.
VEHICLE SPRING.
No. 326,031. Patented Sept. 8, 1885.
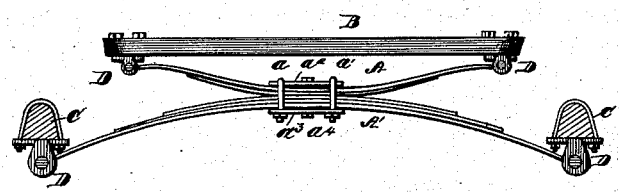
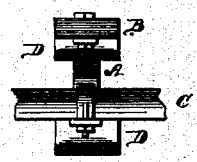
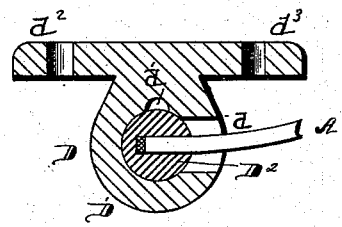
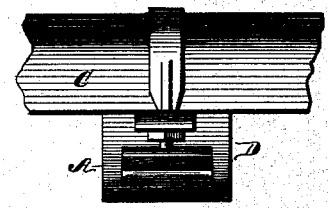
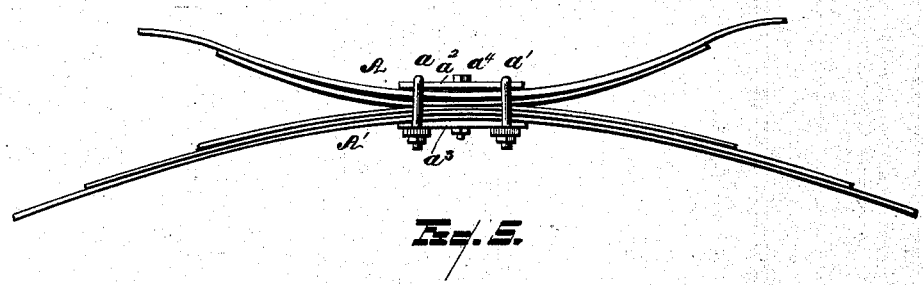
WITNESSES
Samuel E. Thomas
N. S. Wright
Theodore Graether INVENTOR
By W. W. Leggett
Attorney

UNITED STATES PATENT OFFICE.

THEODORE GRAETHER, OF DETROIT, MICHIGAN.

VEHICLE-SPRING.

SPECIFICATION forming part of Letters Patent No. 326,031, dated September 8, 1885.

Application filed June 22, 1885. (No model.)

*To all whom it may concern:*

Be it known that I, THEODORE GRAETHER, of Detroit, county of Wayne, State of Michigan, have invented a new and useful Improvement in Couplings for Vehicle-Springs; and I declare the following to be a full, clear, and exact description of the same, such as will enable others skilled in the art to which it pertains to make and use it, reference being had to the accompanying drawings, which form a part of this specification.

My invention consists of the combinations of devices and appliances hereinafter specified, and more particularly pointed out in the claims.

In the drawings, Figure 1 is a front elevation of a device embodying my invention. Fig. 2 is an end elevation. Fig. 3 is a cross-section of one of my improved couplings. Fig. 4 represents a separate view of the same. Fig. 5 is a separate view of the springs without the couplings.

My invention relates to vehicle springs and couplings.

Heretofore it has been customary to construct vehicle-springs with a hook or eye at the end to receive a clip-bolt, and to otherwise curve them at their ends for various purposes.

It is the object of my invention to dispense with this feature and to construct the springs straight at their ends, securing them together intermediate of their ends with a long firm bearing, and to provide novel couplings to engage the straight ends of the springs, said couplings designed and arranged to prevent friction and rattle, yet at the same time to afford ample play for the springs.

I carry out my invention as follows:

A and A' represent two semi-elliptic springs secured to each other in reverse position.

B represents the buggy-body; C and C', the side bars.

$a$ and $a'$ represent clips connecting the sections A and A' of the springs together.

$a^2$ and $a^3$ are suitable plates upon the top and bottom of the springs, over which the clips engage.

$a^4$ is a bolt inserted through the springs, as shown.

I prefer, as illustrated in the drawings, to locate these sections A and A' in reverse position, so that they shall have a straight bearing for a suitable length. I find that they may be thus located in juxtaposition for a distance of some six inches, although I do not limit myself to the exact dimensions.

It has been found that when the bearing is limited there is a liability for the springs to break; but my arrangement overcomes this liability. The extremities of these springs are constructed straight, as shown in Fig. 5.

Heretofore in many varieties of springs, as already observed, the ends of the springs have been rounded, necessitating the insertion of each end of the spring into the fire, making the turn upon the end. The eye then has to be annealed and counterbored on each side. Brass bushings have also been commonly inserted into each side of the eyes to prevent rattling or squeaking, and these bushings also have to be drilled out, so that the bolt will fit snug; but by making the ends of the springs straight all this work is done away with.

D represents one of my improved couplings, adapted to be secured in any proper manner to the buggy-body, or to the side bars, as the case may be. These couplings are constructed of a case, D', provided with a spindle, $D^2$, journaled therein, said spindle being slotted to receive the end of the spring, as shown more particularly in Fig. 3, the case D' also being constructed with an orifice, $d$, to permit the engagement of the end of the spring with said spindle. By this construction of the coupling, when the end of the spring is engaged therewith, a rocking motion of the spindle is permitted in the case as the spring is depressed, and vice versa.

By constructing the case with an oil-pocket, $d'$, the spindle may be readily lubricated, the coupling being turned upside down and the pocket filled with oil and the spring forced into the orifice of the spindle.

I do not limit myself to any particular way of constructing the couplings so as to be attached to the side bars or body, as they may be provided with arms $d^2$ $d^3$, adapted to receive bolts, as when attached to the body, or clips, as when attached to the side bars, or in any other desired manner.

It is obvious that this construction limits the amount of friction at the ends of the springs, prevents all noise, and affords a firm coupling.

To permit the spring to lengthen when compressed, I prefer that the spring should not be forced into the socket of the spindle the full depth of the socket, but so as to leave room behind it, as shown in Fig. 3, in which an elastic packing may be engaged, if desired.

It is obvious that by this construction the spring has a greater bearing upon the ends, and therefore longer wear is secured.

What I claim is—

1. A spring-coupling consisting of a case adapted to be secured to the body or side bars, having in combination therewith a spindle journaled therein, said spindle slotted to receive the end of the spring, and said case constructed with an orifice to permit the engagement of the spring with said spindle, substantially as described.

2. The combination, with a vehicle-spring constructed with a straight end, of a coupling consisting of a case adapted to be secured to the body or side bars, having in combination therewith a spindle journaled therein, said spindle slotted to receive the end of the spring, and said case constructed with an orifice to permit the engagement of the spring with said spindle, substantially as described.

3. A spring-coupling consisting of a case adapted to be secured to the body or side bars, having in combination therewith a spindle journaled therein, said spindle slotted to receive the end of the spring, and said case constructed with an orifice to permit the engagement of the spring with said spindle, and provided with an oil-pocket, substantially as described.

4. A spring-coupling consisting of a case adapted to be secured to the body or side bars, having in combination therewith a spindle journaled therein, said spindle slotted to receive the end of the spring, and said case constructed with an orifice to permit the engagement of the spring with said spindle, the construction being such that the spring may have room to lengthen in the socket of the spindle when compressed, substantially as described.

5. The combination, with a vehicle-spring constructed of two semi-elliptic springs bound together in reverse position, and having a long bearing intermediate of their extremities and constructed straight at their ends, of a coupling consisting of a case adapted to be secured to the body or side bars, having in combination therewith a spindle journaled therein, said spindle slotted to receive the end of the spring, and said case constructed with an orifice to permit the engagement of the spring with said spindle, substantially as described.

6. The combination, with a spring provided with a spindle at its end, of a case sleeved upon said spindle, said case constructed to be secured in place, substantially as described.

In testimony whereof I sign this specification in the presence of two witnesses.

THEODORE GRAETHER.

Witnesses:
N. S. WRIGHT,
M. B. O'DOGHERTY.